US006880223B2

(12) United States Patent
Bednar

(10) Patent No.: US 6,880,223 B2
(45) Date of Patent: Apr. 19, 2005

(54) GREASE SLINGER

(75) Inventor: Thomas R. Bednar, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 267 days.

(21) Appl. No.: 10/132,679

(22) Filed: Apr. 25, 2002

(65) Prior Publication Data

US 2003/0201110 A1 Oct. 30, 2003

(51) Int. Cl.[7] .......... F16J 15/447

(52) U.S. Cl. .......... 29/434; 29/893.2; 277/412; 177/213

(58) Field of Search .......... 29/434, 456, 457, 29/458, 466, 893, 893.2, 898.04, 898.1, 888.4; 277/412, 418, 419; 173/213, 216, 217

(56) References Cited

U.S. PATENT DOCUMENTS

| | | | |
|---|---|---|---|
| 1,032,724 | A | 7/1912 | Adams |
| 1,613,027 | A | 1/1927 | Fekete et al. |
| 1,732,725 | A | 10/1929 | Kohl et al. |
| 2,210,836 | A | 8/1940 | Joy |
| 2,452,709 | A | 11/1948 | Aiman |
| 2,910,142 | A | 10/1959 | Almen |
| 2,912,065 | A | 11/1959 | Moller |
| 3,123,109 | A | 3/1964 | Bork |
| 3,220,277 | A | 11/1965 | Dixon |
| 3,541,875 | A | 11/1970 | Demorest |
| 3,647,024 | A | 3/1972 | Wick et al. |
| 3,672,586 | A | 6/1972 | Morton |
| 3,719,254 | A | 3/1973 | Snider |
| 3,848,691 | A | 11/1974 | Dolan |
| 3,886,658 | A | 6/1975 | Wikoff |
| 3,903,992 | A | 9/1975 | Chivukula et al. |
| 4,027,546 | A | 6/1977 | Alessio |
| 4,031,780 | A | 6/1977 | Dolan et al. |

(Continued)

FOREIGN PATENT DOCUMENTS

| | | |
|---|---|---|
| DE | 1801917 | 5/1970 |
| FR | 610254 | 9/1926 |
| GB | 807832 | 1/1959 |

OTHER PUBLICATIONS

Assembly drawing of AEG tool, Part No. 926–313–702, published in 1994.

Milwaukee Electric Tool Service Parts List, dated Oct. 1983.

Milwaukee Electric Tool, drawing of Part No. 45–28–0175, from parts list dated Oct. 1983.

*Primary Examiner*—David P. Bryant
*Assistant Examiner*—Stephen Kenny
(74) *Attorney, Agent, or Firm*—Michael Best & Friedrich LLP

(57) ABSTRACT

A grease slinger, power tool and method of assembling a power tool. The power tool includes a housing, a motor supported in the housing and including a rotatable shaft extending along an axis, a gear case connected to the housing, a flange between the housing and the gear case having a first side and a second side and defining an opening extending between the first side and the second side, a drive mechanism supported by the gear case and drivingly engaging the motor shaft, and a grease slinger. The grease slinger includes a body supportable on the shaft for rotation with the shaft relative to the flange. The body has a first face providing a grease-slinging surface and a second face facing the first side of the flange. The second face includes an annular side wall defining an annular channel. The side wall and the channel cooperate with the flange to provide a labyrinth seal and to prevent grease from flowing from the gear case into the housing.

26 Claims, 3 Drawing Sheets

U.S. PATENT DOCUMENTS 4,090,588 A 5/1978 Willover
4,108,018 A 8/1978 John et al.
4,209,086 A 6/1980 Friedrich
4,560,056 A 12/1985 Stockton
4,677,871 A 7/1987 Taniyama et al.
4,741,303 A 5/1988 Kronich
4,766,859 A 8/1988 Miyaki et al.
4,905,535 A 3/1990 Ludwig et al.
4,945,620 A 8/1990 Dassler
5,064,025 A 11/1991 Richards
5,184,967 A 2/1993 Onoue et al.
5,232,291 A 8/1993 Kuan
5,251,406 A 10/1993 Kirn
5,363,723 A 11/1994 Hoffman
5,487,631 A 1/1996 Child
5,636,848 A * 6/1997 Hager et al. ................ 277/420
5,699,877 A 12/1997 Dreier
6,000,140 A 12/1999 Nickels, Jr. et al.
6,008,557 A 12/1999 Dornhoefer et al.
6,109,366 A 8/2000 Jansson et al.
6,145,205 A * 11/2000 Nickels et al. ................ 30/388
6,170,159 B1 1/2001 Kramer et al.
6,226,877 B1 5/2001 Ono
6,273,429 B1 8/2001 Dudinetz et al.
6,471,215 B1 * 10/2002 Drago et al. ................ 277/412
6,722,449 B1 * 4/2004 Lebisch et al. ............. 173/213

* cited by examiner

GREASE SLINGER

FIELD OF THE INVENTION

The invention relates generally to grease slingers and, more particularly, to a grease slinger for a power tool.

BACKGROUND OF THE INVENTION

A mechanical device, such as a power tool, includes a housing, a motor supported by the housing and connectable to a power source to operate the motor, the motor including a motor shaft, a gear case connected to the housing and a drive mechanism supported by the gear case and driven by the motor. A flange separates the gear case and the housing and defines an opening which communicates between the housing and the gear case. The motor shaft extends through the opening and drivingly engages the drive mechanism. Grease is provided in the gear case to lubricate the engagement area of the motor shaft and the drive mechanism and to lubricate the components of the drive mechanism.

SUMMARY OF THE INVENTION

One independent problem with the above-described arrangement is that grease is drawn along the motor shaft towards the housing and towards the components in the housing, such as the motor and bearings. To prevent grease from leaking through the opening in the flange, a grease slinger may be mounted on the motor shaft to deflect grease away from the opening during operation of the motor and rotation of the motor shaft.

Another independent problem with the above-identified arrangement is that, even with a grease slinger, grease may be move into the area between the grease slinger and the flange and flow through the flange opening into the housing, thereby damaging components, such as the motor or bearings. It is difficult to provide a sealed interface between the rotating grease slinger and the stationary flange.

The present invention provides a grease slinger and a power tool which substantially alleviates one or more of the above-identified and other independent problems with existing grease slingers and power tools. Generally, the grease slinger provides a grease-slinging surface and a seal surface which cooperates with the flange to provide a labyrinth seal.

More particularly, the invention provides a grease slinger for preventing flow of grease relative to a flange, the flange having a first side and a second side and defining an opening extending between the first side and the second side, a rotatable shaft extending through the opening and being rotatable about an axis relative to the flange. The grease slinger is defined as including a body supportable on the rotatable shaft for rotation with the shaft relative to the flange. The body has a first face providing a grease-slinging surface and a second face facing the first side of the flange. The second face includes an annular side wall defining an annular channel. The side wall and the channel provide a portion of a labyrinth seal and cooperate with the flange to prevent flow of grease from the first side of the flange to the second side of the flange.

In some constructions, the second face may have an annular second wall defining an annular second channel, and the second channel may be substantially concentric with the first channel. The flange may includes an annular first rib and an annular second rib. The first channel may be configured to receive the first rib and the second channel may be configured to receive the second rib to provide a labyrinth seal between the grease slinger and the flange.

In some constructions, the first face may be convex. The rotatable shaft may be a bevel gear having gear teeth that extend helically along the rotatable shaft, and the body may define an aperture extending between the first face and the second face. In some constructions, the body may include a plurality of fingers extending radially into the aperture, the fingers being adapted to engage between adjacent gear teeth.

In some construction, the body may include a radially inner lip protruding axially from the second face and extending circumferentially around the second face. The radially-inner lip may at least partially surrounds an axial portion of the rotatable shaft.

Also, the present invention provides a grease slinger for a power tool, the power tool including a housing, a motor supported in the housing and including a rotatable shaft, a gear case, a gear mechanism supported in the gear case and mating with the shaft, and a flange between the housing and the gear case having a first side facing the gear case and a second side facing the housing and defining an opening extending between the first side and the second side, the shaft extending through the opening from the housing into the gear case. The grease slinger is defined as including a body supportable on the shaft for rotation with the shaft relative to the flange. The body has a first face providing a grease-slinging surface and a second face facing the first side of the flange. The second face includes an annular side wall defining an annular channel. The side wall and the channel provide a portion of a labyrinth seal and cooperate with the flange to prevent flow of grease from the gear case to the housing.

In addition, the present invention provides a power tool including a housing, a motor supported in the housing and including a motor shaft extending along an axis, a gear case connected to the housing, a flange between the housing and the gear case, the flange having a first side and a second side and defining an opening extending between the first side and the second side and communicating between the housing and the gear case, a drive mechanism supported by the gear case and drivingly engaging the motor shaft, and a grease slinger. The grease slinger is defined as including a body supportable on the shaft for rotation with the shaft relative to the flange. The body has a first face providing a grease-slinging surface and a second face facing the first side of the flange. The second face includes an annular side wall defining an annular channel. The side wall and the channel cooperate with the flange to provide a labyrinth seal and to prevent grease from flowing from the gear case into the housing.

Further, the present invention provides a method of assembling a power tool. The method is defined as including the acts of providing the power tool including a housing, a motor supported in the housing and including a rotatable shaft, a gear case, a drive mechanism supported in the gear case and mating with the shaft, a flange between the housing and the gear case having a first side facing the gear case and a second side facing the housing and defining an opening extending between the first side and the second side, the shaft extending through the opening from the housing into the gear case, providing a grease slinger having a first face providing a grease-slinging surface and a second face including an annular side wall defining an annular channel, supporting the grease slinger on the shaft for rotation with the shaft relative to the flange, positioning the grease slinger adjacent to the opening so that the second face is adjacent to the flange, and engaging the second face and the flange to form a labyrinth seal and to prevent flow of grease from the gear case to the housing.

One independent advantage of the present advantage is the grease slinger deflects grease away from the flange opening during operation of the motor and rotation of the motor shaft.

Another independent advantage of the present invention is that the grease slinger provides a portion of a labyrinth seal and cooperates with the flange to prevent flow of grease from the gear case and into the housing.

Other independent features and independent advantages of the present invention will become apparent to those skilled in the art upon review of the following detailed description, claims and drawings.

Figure 1:
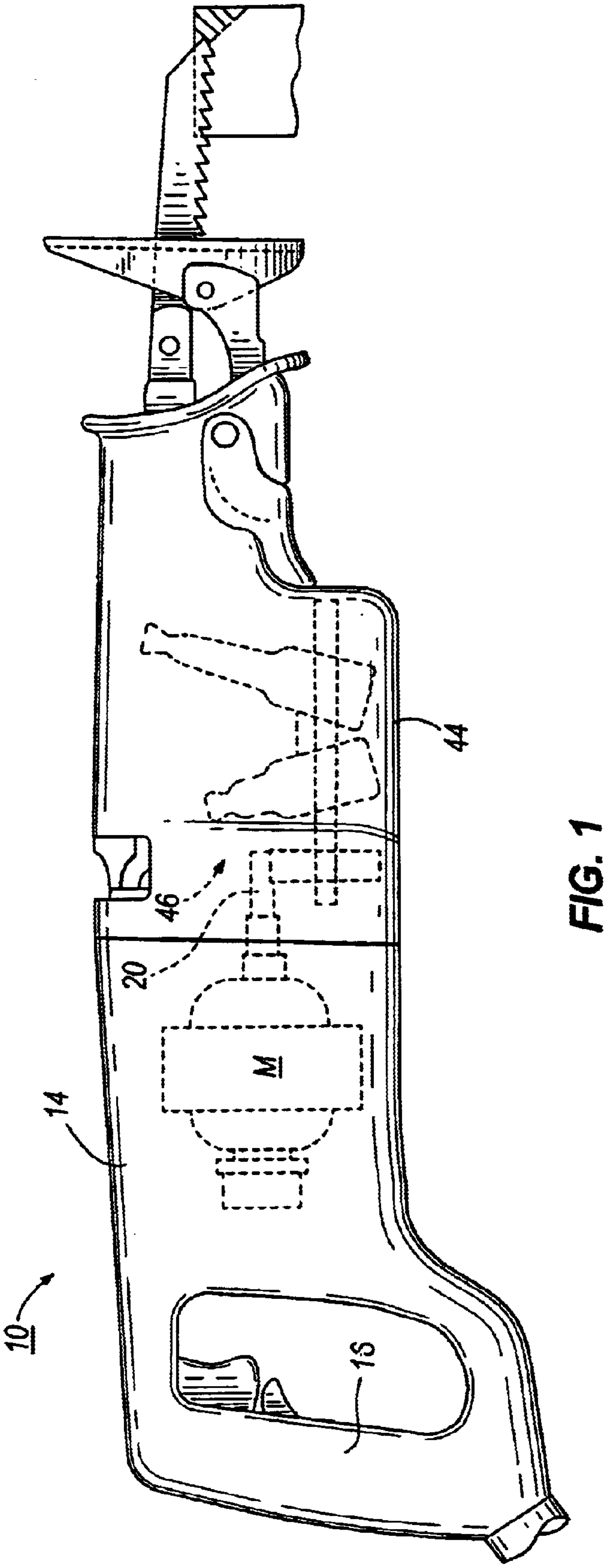
FIG. 1 is a side view of a power tool including a grease slinger embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

FIG. 1 illustrates a power tool 10, such as a reciprocating saw, including a grease slinger 12 embodying the invention. It should be understood that, in other constructions (not shown), the power tool 10 may be another type of power tool, such as, for example, a circular saw, drill, angle grinder, etc., or another type of mechanical device including a grease slinger 12.

Figure 2:
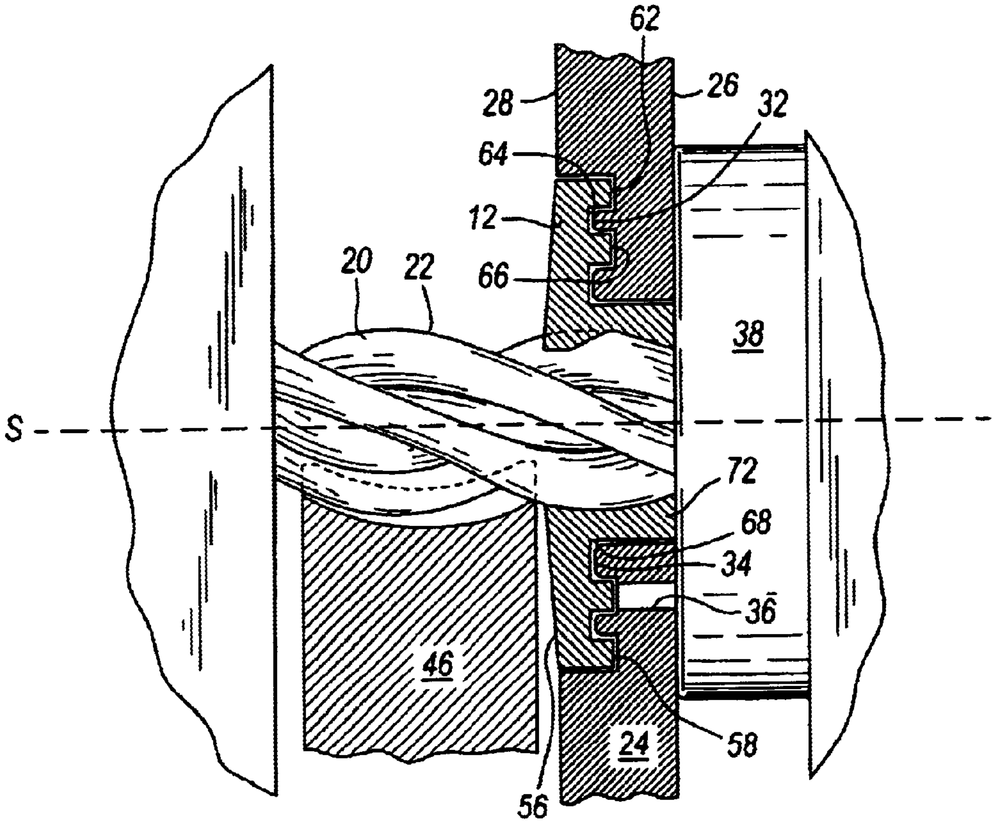
FIG. 2 is an enlarged partial cross-sectional side view of a portion of the power tool shown in FIG. 1.
Figure 3:
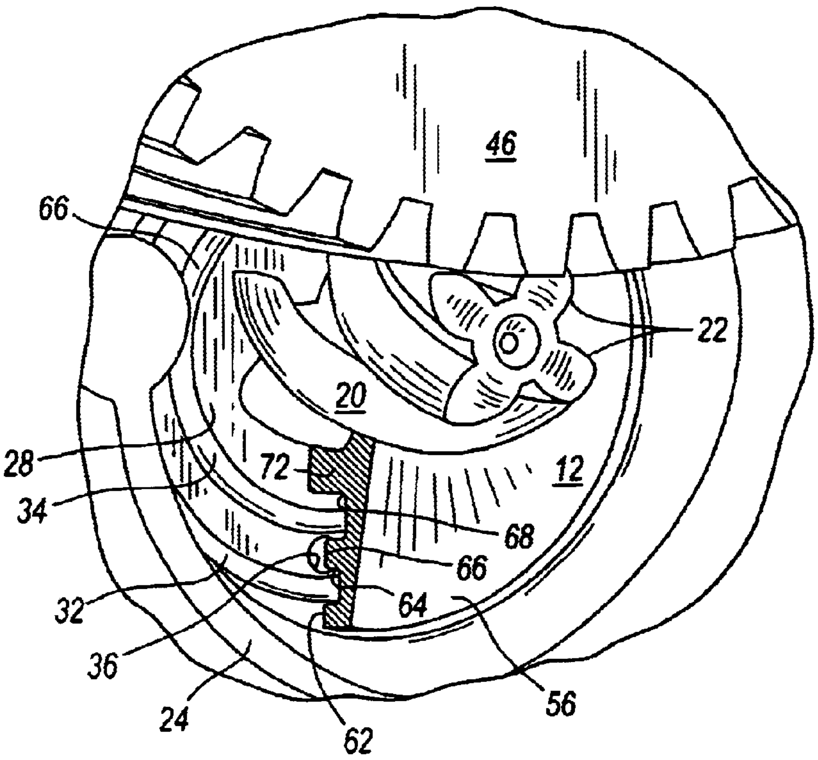
FIG. 3 is an enlarged partial cross-sectional perspective view of a portion of the power tool shown in FIG. 1.

As shown in FIG. 1, the power tool 10 includes a housing 14 having a handle 16 to be gripped by an operator during operation of the power tool 10. A motor M is supported by the housing 14 and includes a motor shaft 20. The motor M is selectively connectable to a power source (not shown) and is operable to rotatably drive the shaft 20 about a shaft axis S. As shown in FIGS. 2 and 3, gear teeth 22 extend helically along the shaft 20.

Figure 5:
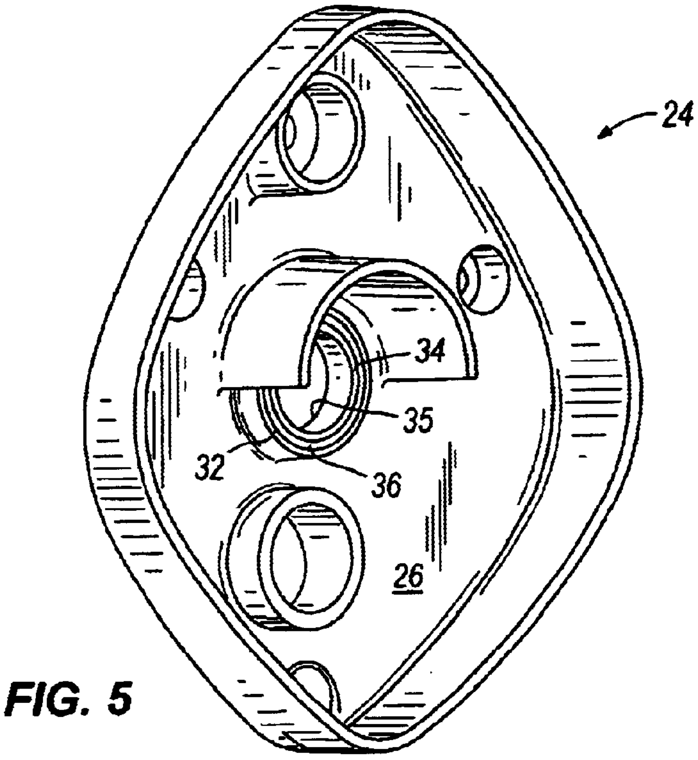
FIG. 5 is a perspective view of the first side of the flange shown in FIG. 2.

As shown in FIGS. 2–3 and 5, a flange 24 is supported by the housing 14 and encloses the motor M in the housing 14. The flange 24 includes one side 26 adjacent to the motor M and an opposite side 28 facing away from the motor M. The opposite side 28 defines annular first and second ribs 32 and 34 extending circumferentially on the opposite side 28 of the flange 24. An opening 35 extends between the sides 26 and 28, and the shaft 20 extends from the housing 14 through the opening 35. As shown in FIG. 2, a drain hole 36 extends through the flange 24 from the housing side 26 to the opposite side 28. Also, a bearing 38 is supported adjacent the housing side 26 of the flange 24 to rotatably support the shaft 20.

The power tool 10 also includes a gear case 44 connected to the opposite side 28 of the flange 24. A drive mechanism 46 is supported by the gear case 44, and the shaft 20 extends through the flange 24 to drivingly engage the drive mechanism 46. In the illustrated construction, the drive mechanism 46 is a reciprocating drive mechanism operable to reciprocate a tool element, such as a saw blade B. Grease is provided in the gear case to lubricate the engagement area between the shaft 20 and the drive mechanism 46 and to lubricate the components of the drive mechanism 46. The gear case 44 and the flange 24 cooperate to house the drive mechanism 46 and the grease.

It should be understood that, in other constructions (not shown), the drive mechanism 46 may be another reciprocating drive mechanism or another type of drive mechanism such as, for example, a rotary drive mechanism. It should also be understood that, in other constructions (not shown), the tool element may be another type of tool element, such as a circular saw blade, a drill bit, a grinding wheel, etc.

Figure 4:
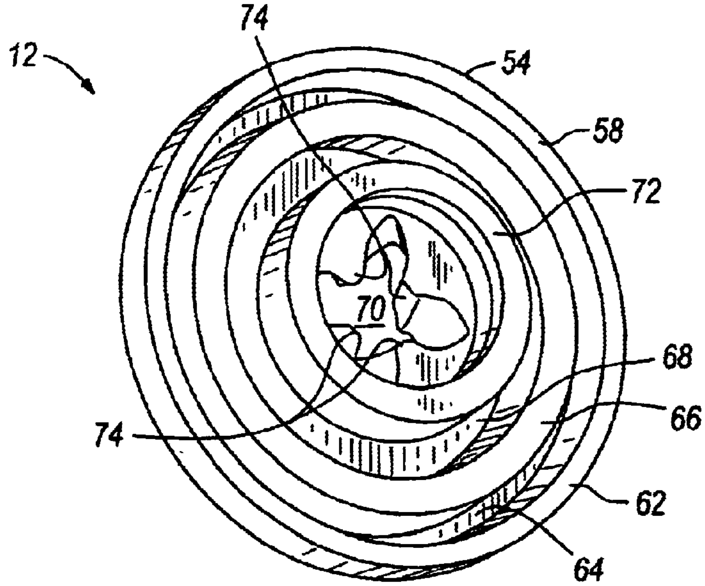
FIG. 4 is a perspective view of the second face of the grease slinger shown in FIG. 2.

As shown in more detail in FIGS. 2–4, the grease slinger 12 includes a body 54 which is supportable on the shaft 20 for rotation with the shaft 20. The body 54 has a first face 56 and a second face 58. As best seen in FIG. 2, the first face 56 provides a grease-slinging surface which, in the illustrated construction, is substantially convex to direct grease radially outward.

As shown in FIG. 4, the second face 58 includes an annular first side wall 62 extending axially from and circumferentially around the second face 58. The first side wall 62 defines an annular first channel 64 extending circumferentially around the second face 58. The second face 58 also includes an annular second side wall 66 extending axially from and circumferentially around the second face 58. The body 54 and the second side wall 66 define an annular second channel 68 which is substantially concentric with the first annular channel 64.

A central aperture 70 extends through the body 54 between the faces 56 and 58, and a radially-inner lip 72 protrudes axially from the second face 58 and extends circumferentially around the aperture 70. As best shown in FIG. 2, when the grease slinger 12 is supported on the shaft 20, the radially-inner lip 72 extends into the opening 35 in the flange 24 and extends around the shaft 20. A plurality of fingers 74 extend radially into the aperture 70. The fingers 74 are configured to mate with the teeth 22 of the shaft 20.

To assemble the power tool 10, the motor M is supported so that the shaft 20 extends through the opening 35 in the flange 24. The grease slinger 12 is positioned on the end of the shaft 20 with the fingers 74 engaging between adjacent teeth 22 and is pushed onto the shaft 20. As the grease slinger 12 is moved onto the shaft 20, the fingers 74 move between the teeth 22 and may slightly deform to provide a tight engagement between the grease slinger 12 and the shaft 20, preventing grease from moving along the shaft 20 on and between the teeth 22.

The grease slinger 12 is positioned adjacent to the side 28 of the flange 24. The ribs 32 and 34 are configured to mate with the first and second annular channels 64 and 68, and the side walls 62 and 66 are configured to be positioned in flange channels defined by the ribs 32 and 34. Also, the lip 72 extends into the opening 35. The drive mechanism 46 and the gear case 44 are then assembled onto the flange 24 to complete assembly of the power tool 10.

As the motor M is operated, the shaft 20 and the grease slinger 12 rotate, and grease engaging the grease-slinging surface of the first face 56 and is slung radially outwardly and axially away from the flange 24. The engagement between the second face 58 of the grease slinger 12 and the flange 24 provides a labyrinth seal, substantially preventing grease from moving from the gear case 44 to the housing 14 while allowing rotation of the grease slinger 12 and shaft 20 relative to the flange 24. In order for grease to pass through the opening 35 and into the housing 14, the grease must move through the tortuous path of the labyrinth seal between the grease slinger 12 and the flange 24. Any small amount of grease which does move into the housing 14 drains back into the gear case 44 through the drain hole 36 and is thrown radially outwardly by the grease slinger 12.

The grease slinger 12 and the flange 24 thus cooperate to substantially prevent flow of grease from the gear case 44 and into the housing 14, preventing any damage which may occur to components (i.e., the motor M) supported in the housing 14.

Various independent features of the present invention are set forth in the following claims:

What is claimed is:

1. A grease slinger for preventing flow of grease relative to a flange, the flange having a first side and a second side and defining an opening extending between the first side and the second side, a rotatable shaft extending through the opening and being rotatable about an axis relative to the flange, the grease slinger comprising:

a body supportable on the rotatable shaft for rotation with the shaft relative to the flange, the body having a first face providing a grease-slinging surface and a second face facing the first side of the flange, the second face including an annular side wall defining an annular channel, the side wall and the channel providing a portion of a labyrinth seal and cooperating with the flange to prevent flow of grease from the first side of the flange to the second side of the flange.

2. The grease slinger of claim 1, wherein the second face includes an annular second wall defining an annular second channel.

3. The grease slinger of claim 2, wherein the second channel is substantially concentric with the first channel.

4. The grease slinger of claim 2, wherein the flange includes an annular first rib and an annular second rib, and wherein the first channel is configured to receive the first rib, and the second channel is configured to receive the second rib to provide a labyrinth seal between the grease slinger and the flange.

5. The grease slinger of claim 1, wherein the first face is convex.

6. A grease slinger for preventing flow of grease relative to a flange, the flange having a first side and a second side and defining an opening extending between the first side and the second side, a rotatable shaft extending through the opening and being rotatable about an axis relative to the flange, the grease slinger comprising:

a body supportable on the rotatable shaft for rotation with the shaft relative to the flange, the body having a first face providing a grease-slinging surface and a second face facing the first side of the flange, the second face including an annular side wall defining an annular channel, the side wall and the channel providing a portion of a labyrinth seal and cooperating with the flange to prevent flow of grease from the first side of the flange to the second side of the flange;

wherein the rotatable shaft is a bevel gear having gear teeth extending helically along the rotatable shaft, and wherein the body defines an aperture extending between the first face and the second face, the body including a plurality of fingers extending radially into the aperture, the fingers being adapted to engage between adjacent gear teeth.

7. The grease slinger of claim 1, wherein the body defines a radially-inner lip protruding axially from the second face and extending circumferentially around the second face.

8. The grease slinger of claim 7, wherein the radially-inner lip at least partially surrounds an axial portion of the rotatable shaft.

9. A grease slinger for a power tool, the power tool including a housing, a motor supported in the housing and including a rotatable shaft, a gear case, a drive mechanism supported in the gear case and mating with the rotatable shaft, and a flange between the housing and the gear case, the flange having a first side facing the gear case and a second side facing the housing and defining an opening extending between the first side and the second side, the shaft extending through the opening from the housing into the gear case, the grease slinger comprising:

a body supportable on the shaft for rotation with the shaft relative to the flange, the body having a first face providing a grease-slinging surface and a second face facing the first side of the flange, the second face including an annular side wall defining an annular channel, the side wall and the channel providing a portion of a labyrinth seal and cooperating with the flange to prevent flow of grease from the gear case to the housing.

10. The grease slinger of claim 9, wherein the second face includes an annular second wall defining an annular second channel.

11. The grease slinger of claim 10, wherein the second channel is substantially concentric with the first channel.

12. The grease slinger of claim 10, wherein the flange includes an annular first rib and an annular second rib, and wherein the first channel is configured to receive the first rib, and the second channel is configured to receive the second rib to provide a labyrinth seal between the grease slinger and the flange.

13. The grease slinger of claim 9, wherein the first face is convex.

14. A grease slinger for a power tool, the power tool including a housing, a motor supported in the housing and including a rotatable shaft, a gear case, a drive mechanism supported in the gear case and mating with the rotatable shaft, and a flange between the housing and the gear case, the flange having a first side facing the gear case and a second side facing the housing and defining an opening extending between the first side and the second side, the shaft extending through the opening from the housing into the gear case, the grease slinger comprising:

a body supportable on the shaft for rotation with the shaft relative to the flange, the body having a first face providing a grease-slinging surface and a second face facing the first side of the flange, the second face including an annular side wall defining an annular channel, the side wall and the channel providing a portion of a labyrinth seal and cooperating with the flange to prevent flow of grease from the gear case to the housing;

wherein the rotatable shaft is a bevel gear having gear teeth extending helically along the rotatable shaft, and wherein the body defines an aperture extending between the first face and the second face, the body including a plurality of fingers extending radially into the aperture, the fingers being adapted to engage between adjacent gear teeth.

15. The grease slinger of claim 9, wherein the body includes a radially-inner lip protruding axially from the second face and extending circumferentially around the second face.

16. The grease slinger of claim 15, wherein the radially-inner lip at least partially surrounds an axial portion of the rotatable shaft.

17. A power tool comprising:

a housing;

a motor supported in the housing and including a rotatable shaft extending along an axis;

a gear case connected to the housing;

a flange between the housing and the gear case, the flange having a first side and a second side and defining an opening extending between the first side and the second side and communicating between the housing and the gear case, the motor shaft extending through the opening;

a drive mechanism supported by the gear vase and drivingly engaging the motor shaft; and a grease slinger including a body supportable on the shaft for rotation with the shaft relative to the flange, the body having a first face providing a grease-slinging surface and a second face facing the first side of the flange, the second face including an annular side wall defining an annular channel, the side wall and the channel cooperating with the flange to provide a labyrinth seal and to prevent grease from flowing from the gear case into the housing.

18. The grease slinger of claim 17, wherein the second face includes an annular second wall defining an annular second channel.

19. The grease slinger of claim 18, wherein the second channel is substantially concentric with the first channel.

20. The grease slinger of claim 18, wherein the flange includes an annular first rib and an annular second rib, and wherein the first channel is configured to receive the first rib, and the second channel is configured to receive the second rib to provide a labyrinth seal between the grease slinger and the flange.

21. The grease slinger of claim 17, wherein the first face is convex.

22. A power tool comprising:

a housing;

a motor supported in the housing and including a rotatable shaft extending along an axis;

a gear case connected to the housing;

a flange between the housing and the gear case, the flange having a first side and a second side and defining an opening extending between the first side and the second side and communicating between the housing and the gear case, the motor shaft extending through the opening;

a drive mechanism supported by the gear case and drivingly engaging the motor shaft; and a grease slinger including a body supportable on the shaft for rotation with the shaft relative to the flange, the body having a first face providing a grease-slinging surface and a second face facing the first side of the flange, the second face including an annular side wall defining an annular channel, the side wall and the channel cooperating with the flange to provide a labyrinth seal and to prevent grease from flowing from the gear case into the housing;

wherein the rotatable shaft is a bevel gear having gear teeth extending helically along the rotatable shaft, and wherein the body defines an aperture extending between the first face and the second face, the body including a plurality of fingers extending radially into the aperture, the fingers being adapted to engage between adjacent gear teeth.

23. The grease slinger of claim 17, wherein the body includes a radially-inner lip protruding axially from the second face and extending circumferentially around the second face.

24. The grease slinger of claim 23, wherein the radially-inner lip at least partially surrounds an axial portion of the rotatable shaft.

25. A method of assembling a power tool, the method comprising the acts of:

providing the power tool including a housing, a motor supported in the housing and including a rotatable shaft, a gear case, a drive mechanism supported in the gear case and mating with the shaft, a flange between the housing and the gear case having a first side facing the gear case and a second side facing the housing and defining an opening extending between the first side and the second side, the shaft extending through the opening from the housing into the gear case;

providing a grease slinger having a first face providing a grease-slinging surface and a second face including an annular side wall defining an annular channel;

supporting the grease slinger on the shaft for rotation with the shaft relative to the flange;

positioning the grease slinger adjacent to the opening so that the second face is adjacent to the flange; and engaging the second face and the flange to form a labyrinth seal and to prevent flow of grease from the gear case to the housing.

26. The method of claim 25, wherein the rotatable shaft is a bevel gear having gear teeth extending helically along the rotatable shaft, wherein the body defines an aperture extending between the first face and the second face, the body including a plurality of fingers extending radially into the aperture, and wherein the supporting act includes engaging the fingers being between adjacent gear teeth.

* * * * *